United States Patent [19]

Collette

[11] Patent Number: 4,755,404

[45] Date of Patent: Jul. 5, 1988

[54] REFILLABLE POLYESTER BEVERAGE BOTTLE AND PREFORM FOR FORMING SAME

[75] Inventor: Wayne N. Collette, Merrimack, N.H.

[73] Assignee: Continental PET Technologies, Inc., Norwalk, Conn.

[21] Appl. No.: 12,951

[22] Filed: Feb. 10, 1987

Related U.S. Application Data

[63] Continuation-in-part of Ser. No. 868,729, May 30, 1986, Pat. No. 4,725,464.

[51] Int. Cl.$^4$ .............................................. B65D 1/02
[52] U.S. Cl. .................................... 428/35; 215/1 C; 220/70
[58] Field of Search ............. 215/1 C; 428/35, 542.8; 220/70

[56] References Cited

U.S. PATENT DOCUMENTS

| | | | |
|---|---|---|---|
| 4,053,076 | 10/1977 | Vogel et al. | 215/12 R |
| 4,334,627 | 6/1982 | Krishnakumar et al. | 215/1 C |
| 4,403,706 | 9/1983 | Mahajan | 215/1 C |
| 4,465,199 | 8/1984 | Aoki | 215/1 C |
| 4,467,924 | 8/1984 | Jokobsen et al. | 215/1 C |
| 4,496,064 | 1/1985 | Beck et al. | 215/1 C |
| 4,525,401 | 6/1985 | Pocock et al. | 215/1 C |
| 4,535,901 | 8/1985 | Okudaira et al. | 215/1 C |
| 4,603,831 | 8/1986 | Krishnakumar et al. | 215/1 C |
| 4,615,925 | 10/1986 | Nilsson | 215/1 C |

Primary Examiner—John E. Kittle
Assistant Examiner—James J. Seidleck
Attorney, Agent, or Firm—Charles E. Brown

[57] ABSTRACT

A returnable/refillable container in the form of a blow molded polyester biaxially oriented bottle having a physical and structural relationship providing for the maintenance of aesthetic and functional viability over a minimum of five trips wherein each trip comprises (1) an empty state caustic wash followed by (2) contaminant inspection and product filling/capping, (3) warehouse storage, (4) distribution to wholesale and retail locations, and (5) purchase, use and empty storage by the consumer followed by return to a bottler. The container is obtained utilizing a specific preform configuration and reheat blow process wherein the sidewall of the resultant container has a percent crystallinity of 24-30 at a total preform draw ratio of 7-9/1. The container is formed utilizing recently developed process techniques to optimize strain induced sidewall crystallization.

16 Claims, 1 Drawing Sheet

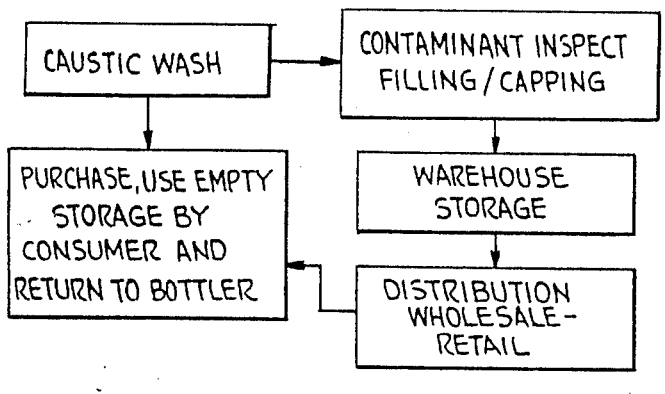
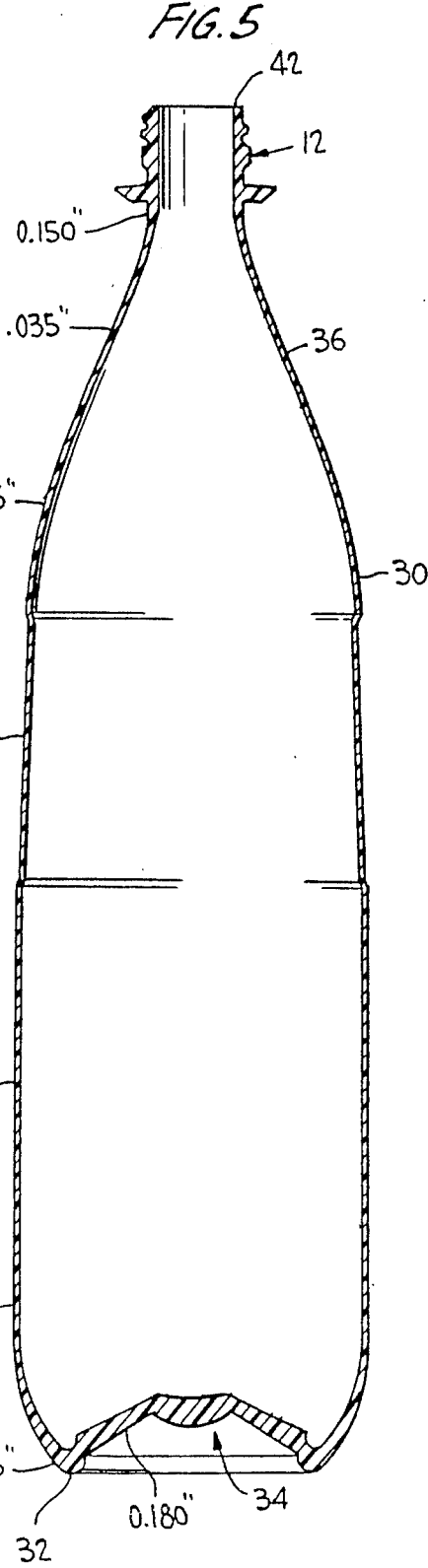
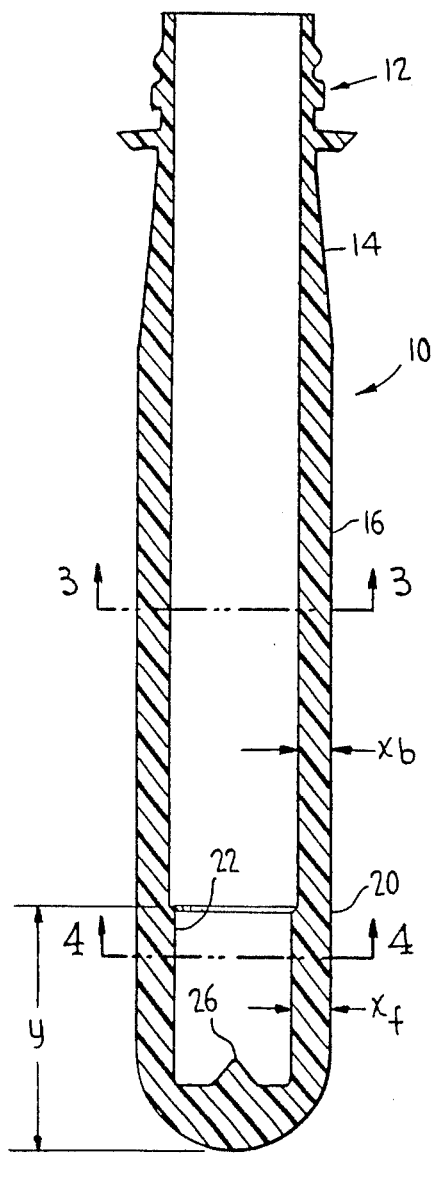
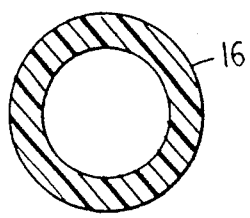
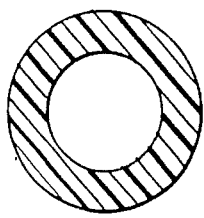
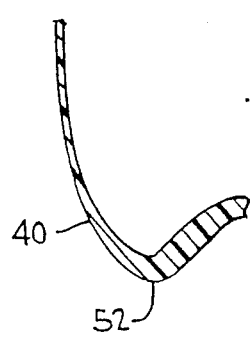

REFILLABLE POLYESTER BEVERAGE BOTTLE AND PREFORM FOR FORMING SAME

This application is a continuation-in-part of my co-pending application Ser. No. 868,729 filed May 30, 1986, now U.S. Pat. No. 4,725,464.

This invention relates to new and useful improvements in plastic bottles, and more particularly to a plastic bottle which is refillable.

An economically and commercially viable, refillable plastic bottle would reduce the existing landfill and recycle problems associated with disposable plastic beverage bottles and more particulary with plastic beverage bottles formed of PET. In addition, a refillable bottle would permit the entry of the safer, lighter weight plastic containers into those markets, currently dominated by glass, where legislation prohibits use of non-returnable packages.

Technically, a refillable plastic bottle must remain commercially aesthetically and functionally viable over a minimum of five and preferably over ten trips or loops to be considered economically feasible. A loop is comprised of (1) an empty caustic wash followed by (2) contaminant inspection and product filling/capping, (3) warehouse storage, (4) distribution to wholesale and retail locations and (5) purchase, use and empty storage by the consumer followed by eventual return to the bottler. To achieve viability, the plastic container should maintain a fill level volume variation of one and one half percent or less and resist breakage due to impact, burst and/or environmental stress crack failure over its useful life.

The ideal plastic refillable container must be clear and transparent to permit visual contaminant inspection prior to filling. In addition, the container should be of a one piece construction with an integral blow molded base member to eliminate visual inspection and other problems associated with two piece containers (i.e., two piece being defined as a blow molded body with a hemispherical closed end typically attached to an injection molded base cup where the base cup provides vertical stability).

At this point it is to be understood that several polymer candidates provide the clarity and physical properties deemed necessary to produce refillable plastic bottles and like containers. These polymers include polyethylene terephthalate (PET), acrylonitrile, polyarylate, polycarbonate, etc. Of the polymers commercially available, PET offers the best balance of properties and cost/performance ratios.

Non-returnable PET beverage containers are commercially produced for the most part by way of a two step process which involves the injection and/or extrusion molding of a preform followed by reheating of the preform, equilibration and stretch blow molding to the desired container geometry. Application of known beverage bottle technology for returnable PET containers does not yield acceptable performance results. In particular, containers produced by way of conventional preform and bottle design and process conversion techniques typically fail versus refillable performance specifications criteria after two to three trips or loops.

In accordance with the foregoing, it is the object of this invention to provide a thermoplastic PET container which retains its aesthetic and functional performance over five to ten complete refill trips or loops. It is a further object of this invention to provide a preform for forming such a container. With the above and other objects in view that will hereinafter appear, the nature of the invention will be more clearly understood by reference to the following detailed description, the appended claims and the several views illustrated in the accompanying drawings.

FIG. 1 is a schematic showing the typical cycle or loop through which a refillable container must pass.

FIG. 2 is a vertical sectional view taken through a preform of a special configuration wherein the desired bottle structural characteristics may be obtained.

FIG. 3 is a fragmentary transverse sectional view taken generally along the line 3—3 of FIG. 2 and shows the general cross section of the preform.

FIG. 4 is a transverse horizontal sectional view taken generally along the line 4—4 of FIG. 2 and shows the cross section of the preform in a flute area.

FIG. 5 is a vertical sectional view taken through a typical refillable bottle formed in accordance with this invention.

FIG. 6 is an enlarged fragmentary sectional view showing specifically a desired lower body and base configuration.

It has been found that failure (via crack initiation and propagation) of biaxially oriented blow molded PET bottles and like containers exposed to caustic wash baths occurs primarily in the base area and most particularly in the central part of the base area which has little or no orientation. Further, in recent years there has been developed a method of increasing the structural integrity of the bottom structure of a blow molded plastic material container as is disclosed, for example, in U.S. Pat. No. 4,334,627 granted June 15, 1982. In accordance with this patent, the preforms are provided in the lower portion thereof, i.e. that portion which becomes the container base, with longitudinal ribs.

In addition, it has been found in recent years that the intrinsic viscosity of PET homopolymers is an important factor relative to reducing crack initiation and propagation problems.

With the foregoing as starting points, preforms of the type disclosed in U.S. Pat. No. 4,334,627 were produced by conventional molding techniques using PET homopolymers having intrinsic viscosities of 0.72, 0.85 and 1.06, respectively, as measured by ASTM D 2857 standards. More particularly, the preforms with a molded threaded neck finish, were circular in cross section, six inches in length below the neck finish and having an outside diameter of 1.125 inch at the mid body with a wall thickness on the order of 0.180 ±0.020 inch. This preform was utilized to form one liter bottles having a height below the neck finish of 10.0 inches, and a maximum diameter of 3.0 inches with a "champagne" push-up base.

Conventional process conditions were utilized, these conditions including:

| | |
|---|---|
| Preform reheat time | 75 seconds |
| Blow time | 2.5 seconds |
| Total mold cycle time | 6.5 seconds |
| Mold temperature | 40° F. |

Preform reheat temperatures were adjusted to yield a wall thickness in the container body of 20 ±5 mil with a minimum preform temperature necessary to produce clear containers. Average preform temperatures, as measured in an isoparabolic drop calorimeter, were 185° F., 192° F. and 208° F. respectively for the 0.72, 0.84 and 1.06 intrinsic viscosity polymers.

Containers formed in accordance with the above program were subjected to the following simulated life cycle:

First of all, each container was subjected to a typical commercial caustic wash solution which was prepared with 3.5% sodium hydroxide by weight with tap water. The wash solution was maintained at 140° F. and the bottles were submerged uncapped in the wash for 15 minutes to simulate the time/temperature conditions of a commercial bottle wash system.

After removal from the wash solution, the bottles were rinsed in tap water and then filled with a carbonated water solution at 4.0 ±0.2 atmospheres, capped and placed in a 100° F. convection oven at 50% RH for 24 hours. However the fill pressure may be as high as 5 volumes. This elevated oven temperature was selected to simulate longer commercial storage periods at lower ambient temperatures. Upon removal from the oven, the containers were emptied and again subjected to the same wash/fill cycle until failure.

In addition, control bottles from the 0.84 intrinsic viscosity run were (1) exposed to twenty consecutive wash cycles for fifteen minutes each with no pressure exposure between cycles and (2) others were exposed to twenty consecutive pressure fill and elevated temperature storage cycles with *no* caustic wash exposure between cycles. Results of such tests are tabulated below:

| IV | Cycles to Initial Failure | 10 Cycle % Volume Change | Average Final Perpendicularity (TIR) |
|---|---|---|---|
| 0.72 | 3 | −10.5 | 0.182 inch |
| 0.84 | 6 | −6.9 | 0.139 |
| 1.06 | 7 | −7.6 | 0.120 |
| 0.84 (Wash Only) | N/A | −16.8 | 0.020 |
| 0.84 (Pressure Only) | N/A | +8.9 | 0.135 |

A failure was defined as any crack propagating through the PET bottle wall which resulted in leakage and pressure loss. No cracks were seen in the 0.84 intrinsic viscosity bottles that were exposed only to caustic wash or pressure filled cycling. Bottles in each run exposed to a complete wash/pressure cycling failed in seven cycles or less.

Given the above, it was concluded that the caustic solution acts as a stress crack agent if, and only if, residual stresses were present in the PET bottles due to geometrical strains imparted to the polyester during the pressurization cycles.

All cracks initiated on the interior surface of the bottle and propagated through to the exterior wall. Several crack initiation mechanisms were noted: (1) radial cracks initiating at the base contact radius and propagating around the base; (2) radial cracks initiating on the interior surface of the structural reinforcing ribs and propagating around the base, and (3) axial cracks initiating opposite the preform injection gate and propagating axially through the bottle base. All failures occurred in the unoriented base area of the bottle (biaxial orientation as occurs in the bottle sidewalls significantly improves crack resistance). Axial crack initiation but not propagation was evident in the shoulder or neck transition area (from the unoriented to the oriented PET bottle sidewall).

It is to be understood that there is a certain degree of creep (i.e. non-elastic volume expansion over time) which occurs in PET bottles under internal pressure. Notwithstanding this, overall volume shrinkage due to 140° F. washing exceeded the filled 100° F. creep level and objectionable distortion in the shoulder transition area between the bottle body and the neck finish was evident on all bottles exposed to the elevated temperature caustic washing; as was the gradual "chalking" of the outside surface of the bottles. This chalking or whitening was most pronounced in the low orientation transition area between amorphous non-oriented and semi-crystalline oriented. From the foregoing, it can be concluded that bottles produced using presently commercially acceptable conventional non-returnable PET beverage bottle technology are unacceptable for multiple trip usage. The principal problems include 140° shrinkage in excess of the creep which occurs during the filled portion of a simulated commercial cycle and stress crack failures during the wash portion of the cycle.

At this time it is pointed out that the maximum permissible volume deviation is ±1.5% and crack failures of any type are unacceptable.

After much work, it was found that the crack problem could be greatly reduced by in lieu of providing a rib reinforced base, the reinforcing for the base be continuous. Accordingly, as is shown in FIG. 2, there has been provided a preform 10. The preform 10 has at its open upper end a molded threaded neck finish 12 and below the neck finish 12 the preform 10 is of a tapered increasing thickness in the area 14. The primary portion of the length of the preform 10 is in the form of a body portion 16 which is generally of a constant thickness and is annular in cross section as is shown in FIG. 3. Most particularly, a base portion 20 is provided with what is generally considered a flute 22 which provides for a thickening of the base portion over that of the body portion 16. While the wall thicknesses of the body portion and the base portion may be varied, the body to base portion wall thickness ratio will remain constant. The flute 22 extends down into the bottom of the preform 10.

A change was also made in the resultant bottle 30 which is provided with a base which has a contact diameter radius 32. As is best shown in FIG. 6, the radius 32 was increased from 0.100 inch to 0.150 inch. However, the base contact diameter radius may be as great as 0.300 inch and the inside base blend radius may be on the order of 0.030 to 0.050 inch.

Preforms with the flute as opposed to the ribs were produced with 0.84 intrinsic viscosity PET and reheat blown to form a bottle such as, but different from the bottle 30 of FIG. 5, but with the increase in the critical contact diameter radius 32.

These bottles were subjected to consecutive wash/pressure cycles of the type disclosed above. No crack of the radial type described above occurred after ten cycles. Cracks of the axial type did initiate in the base 34 and shoulder 36 regions of the bottles after fifteen cycles, but no propagation failures were seen. On the other hand, total volume shrinkage approached 7.0%. Visible distortion was evident in the shoulder orientation-transition area and the bottles exhibited visible whitening due to caustic salt deposition.

This success led to the conclusion that commercially viable, refillable PET containers would be feasible if the container structure minimized geometry induced stress build-up during pressurization periods and if the shrinkage/distortion problem at 140° F. could be reduced to a level below ±1.5% volume change over 5 to 10 loops and as high as 20 loops.

At this time there has been developed technology which increases the thermal stability of PET containers through the application of product configuration and process control features to increase the percent crystallinity of the PET morphology in the blow molded containers.

Density as measured by ASTM test method #1505 is a useful measure of crystallinity as per:

$$\text{Percent crystallinity} = \frac{ds - da}{dc - da} \times 100$$

where:
ds = sample density in gcm$^3$
da = 1.333 gcm$^3$ (amorphous)
dc = 1.455 gcm$^3$ (100% crystalline)

Increasing the percent crystallinity in the container side wall reduces polymer molecular mobility and thus container shrinkage at a given temperature.

Typical prior art techniques to raise PET bottle sidewall crystallinity involve heat setting by blowing the container into a mold maintained at 300-400° F. and subsequent internal cooling.

The recently developed technology utilizes container design and process control techniques rather than typical heat set techniques to produce containers with a 24-30% crystallinity level and improved thermal stability (i.e. resistance to shrinkage at elevated temperatures) vs. that of containers produced by conventional non-returnable PET bottle technology.

In accordance with the aforementioned recently developed technology, the preform may be reheated on a conventional stretch blow molding machine equipped with a quartz IR reheat oven wherein the preform is heated to a temperature just prior to stretch blowing on the order of 225° F. to 245° F.

This newly developed technology was utilized in conjunction with a preform configured to yield an initial wall thickness of 0.180 ±0.020 inch and a final bottle wall thickness of 0.020 ±0.005 inch with a total preform draw ratio of eight to one. This preform had a weight of 100 grams and a length below the neck finish of 6.250 inches and a mid body diameter of 1.250 inches.

Further, the length of the tapered portion 14 of the preform was greatly increased which permits orientation of the shoulder area 36 to within 0.250 inch of the finish area, and as close as 0.100 inch, for a generic 1.5 liter bottle configuration as is shown in FIG. 5.

Preforms were injection molded of 0.84 intrinsic viscosity PET homopolymer. The increased preform wall thickness over that of the previous preforms resulted in partial molecular recrystallization in the injection cavity. As such, the decrease in transparency (i.e. haze) in these preforms was measurably higher than in the originally discussed preforms as measured by ASTM D-1003 standards.

These preforms were heated to a temperature of 245° F. (the maximum achievable prior to the onset of surface crystallization). In addition, the blow mold temperature was increased to 180° F. to permit bottle annealing prior to removal from the blow mold. The finished bottles were subjected to twenty simulated wash/pressure trips. No radial stress crack failures were evident even after twenty cycles or loops. Several containers contained minor axial base cracks that initiated at the preform injection gate but did not propagate through the wall to permit pressure loss. Final volume change was −0.65% which is well within the ± 1.5% fill level specification. On the other hand, final perpendicularity (TIR) averaged 0.225 inch vs. a target of 0.180 inch. Burst pressure exceeded 180 psi. However, 40% of the containers tested for 6', H$_2$O filled, ambient, 90° impact, failed. However, it is apparent from the test that bottles formed in accordance with this invention may readily complete 5 to 10 loops even with the thinner wall thickness.

Pressurized perpendicularity problems with one piece containers are typically associated with variations in wall thickness around the base contact or chime radius. Pressurized PET will creep over time particularly at elevated temperatures. Unoriented PET, as per the base area 34 of the container in FIG. 5 will creep more extensively than oriented PET. In addition, the extent of creep will increase with decreasing wall thickness.

To minimize the radial wall thickness variation, the injection gate must be accurately centered within the blow base. To accomplish perfect centering, the previously provided preform was modified to have a projection 26 on the inside closed end of the preform for engaging a recess in a tip of a stretch blow centering rod (not shown) which centering rod is customary. The centering rod in turn guides the preform accurately to the center of the blow base during the inflation process.

Drop impact failures in one piece champagne base configuration containers usually occur in the unoriented, amorphous area of the base due to the reduced strength of this area vs the oriented sidewalls. Crack failures usually initiate in the chime area (radius 32) at the point of impact and propagate through the unoriented wall thickness. To minimize impact failure, the preform was modified so as to reduce the length of the flute thereby reducing the unoriented wall thickness in the base chime area (radius 32).

Finally, to reduce the incident of axial crack initiation during caustic wash cycling, the preform was modified to increase the wall thickness in the area of the injection gate, i.e. at the base of the preform. It will be seen that this base portion is generally flat as opposed to the customary generally uniformed cross section.

Bottles were formed with this modified preform construction which is most specifically illustrated in FIG. 1 to form bottles of the configuration as is generally shown in FIG. 5 but with the base chime area 40 being of the configuration shown in FIG. 6 and with the radius 32 being 0.150 inch, although this radius may be increased to be as high as 0.300 inch. These so formed bottles manufactured with the preform temperature and blow mold temperature and timing as discussed above were subjected to twenty consecutive caustic wash/pressure fill cycles. No axial or radial crack initiation was evident. All containers were within the ±1.5% volume specification even after twenty cycles. Perpendicularity (TIR) averaged 0.085 inches with no individual bottle being above 0.150 inch. Caustic salt build-up on the containers resulted in some surface whitening. However, the residue was easily removed by manual scrubbing.

At this time, it is pointed out that the resultant containers can be further improved by additional known commercial processes. For example, a commercially available polymer coating may be applied to the refillable container to minimize scuffing/scratching over the useful life period and to eliminate whitening of the container surface over repeated caustic wash cycles. Also, there may be applied commercially available preform thread finish crystallization techniques to increase the modulus of the finish as required to minimize damage to the critical top sealing radius 42 of the bottle as shown in FIG. 5.

The preform may also be formed of a multilayer construction including internal barrier layers so as to extend shelf life. The application of such multilayer preforms may be utilized to reduce contaminant absorption (if filled with non-food products) and subsequent product contamination after washing and refilling.

Although an acceptable container was at hand, it was decided to explore the effect of higher sidewall crystallinity levels. Bottles of the type described above were produced under identical conditions except that the blow mold temperature was increased to 350° F. and internal cooling was introduced into the bottle prior to removing the heat set bottle from the blow mold. Percent crystallinity was calculated via sidewall density measurements at 31.5.

The containers formed in accordance with the above were cycled through the caustic wash/pressure pack test and 60% of the samples failed by way of axial and radial sidewall cracks in less than twenty cycles. While physical measurements indicated excellent dimensional stability, it was concluded that excessive sidewall crystallization beyond 30% raises the modulus of the biaxially oriented PET matrix to the point where repeated expansion/contraction cycling causes a semi-rigid morphology to fail.

Under the circumstances, it is believed that 24-30% crystallinity is an optimum level for a refillable PET container which is preferably in the form of a bottle having an injection molded threaded neck finish.

In order that the details of a bottle which may withstand 20 cycles may be fully appreciated by one skilled in the art, in FIG. 5 there has been applied to the bottle drawing the dimensions of the wall thickness of such bottle at various points in the bottle. When the bottle is required to withstand a lesser number of cycles, for example on the order of 5 to 10 cycles, the various wall thicknesses may be less.

Although only a preferred embodiment of the refillable PET plastic bottle and the preform from which it is formed has been specifically set forth herein, it is to be understood that minor variations may be made in either the bottle or the preform without departing from the spirit and scope of the invention.

I claim:

1. A returnable/refillable container comprising a blow molded polyester biaxially oriented container having a physical and structural relationship defining means for maintaining commercial aesthetic and functional viability (including a maximum permissible volume deviation of ±1.5%, an absence of crack failure, and no discoloration or other aesthetic changes) over a minimum of at least 5 loops wherein each loop comprises:
   (1) an empty state hot commercially equivalent caustic wash at a temperature of at least on the order of 140° F. followed by
   (2) contaminant inspection and product filling/capping under pressure conditions on the order of 4 atmospheres or higher,
   (3) warehouse storage,
   (4) distribution to wholesale and retail locations, and
   (5) purchase, use and empty storage by the consumer followed by return to a bottler.

2. A container according to claim 1 wherein said product filling/capping includes filling with a carbonated liquid.

3. A container according to claim 1 wherein said container is a bottle having a neck finish for receiving a screw threaded closure.

4. A container according to claim 1 wherein said polyester is PET.

5. A container according to claim 1 wherein said polyester is PET having a sidewall crystallization of 24-30%.

6. A container according to claim 5 wherein said container has a sidewall defining a container portion of minimum thickness, and said crystallization being measured in said sidewall.

7. A container according to claim 1 wherein said container includes a primarily cylindrical body having a diameter and a sidewall thickness of 0.7 to 0.9% of said diameter.

8. A container according to claim 1 wherein said container has a champagne type base including a peripheral contact radius and an unoriented recessed central portion.

9. A container according to claim 1 wherein said container has a champagne type base including a peripheral contact radius and an unoriented recessed central portion, said unoriented central portion being of increased thickness as compared to like container bases.

10. A container according to claim 1 wherein said container has a champagne type base including a peripheral contact radius and an unoriented recessed central portion, said peripheral contact radius being on the order of 0.150 inch and greater.

11. A container according to claim 1 wherein volume change in said container is shrinkage.

12. A container according to claim 1 wherein said container has an injection molded threaded neck finish and said container has orientation to within 0.250 inch of said neck finish.

13. A container according to claim 1 wherein the average perpendicularity of said container after 5 loops is 0.150 inch or less.

14. A container according to claim 1 wherein said container has the physical and structural relationship to maintain said commercial aesthetic and functional viability for as many as 10 loops.

15. A container according to claim 1 wherein said container has the physical and structural relationship to maintain said commercial aesthetic and functional viability for as many as 20 loops.

16. A container according to claim 1 wherein said container was rinsed following said hot caustic wash.

* * * * *